Figure 2:
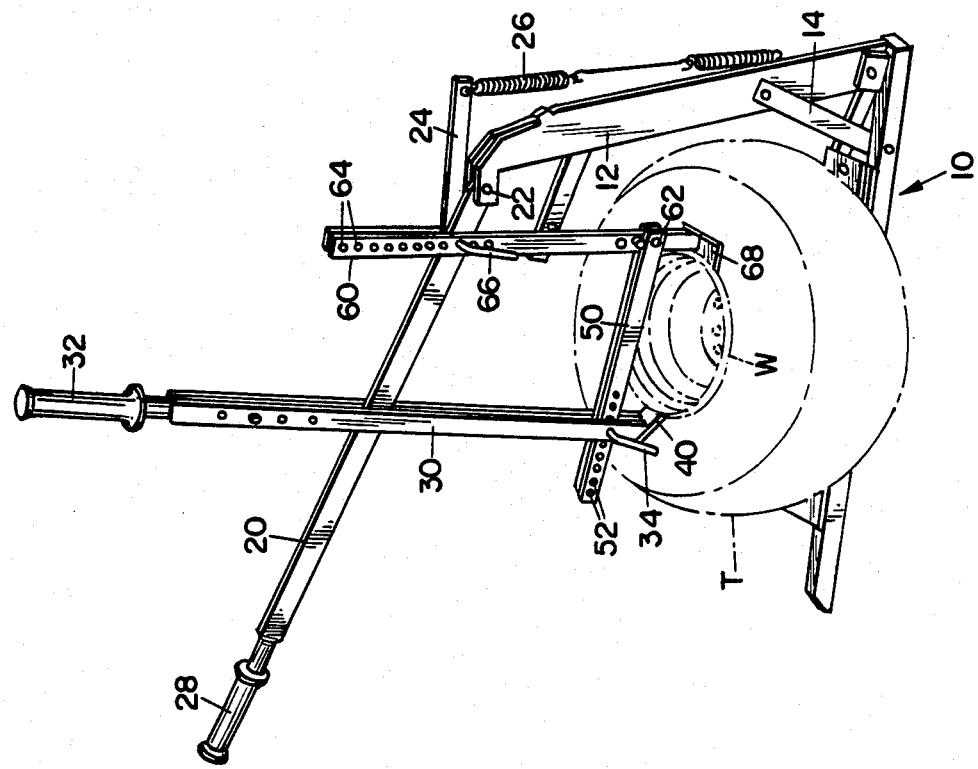

United States Patent [19]

Bolger

[11] Patent Number: 4,676,291
[45] Date of Patent: Jun. 30, 1987

[54] TIRE BEAD BREAKER

[76] Inventor: Joseph E. Bolger, Summer St., Barre, Mass. 01005

[21] Appl. No.: 794,782

[22] Filed: Nov. 4, 1985

[51] Int. Cl.$^4$ ............................................. B60C 25/06
[52] U.S. Cl. .................................................. 157/1.17
[58] Field of Search .................... 157/1.26, 1.28, 1.17, 157/1.2

[56] References Cited

U.S. PATENT DOCUMENTS

| | | | |
|---|---|---|---|
| 2,652,103 | 9/1953 | Danrota et al. | 157/1.17 |
| 2,760,563 | 8/1956 | Bishman | 157/1.26 |
| 3,354,928 | 11/1967 | Copeland et al. | 157/1.2 |

Primary Examiner—Frederick R. Schmidt
Assistant Examiner—Debra S. Meislin
Attorney, Agent, or Firm—Ross, Ross & Flavin

[57] ABSTRACT

Hand operated mechanism for breaking loose the beads of a tire mounted on a wheel having an interior annulus and rim flange adjacent a bead seat for receiving the tire bead includes a platform for supporting the wheel and tire, a linkage-supporting column extending upwardly from the platform, a pair of operators and supporting linkage therebetween supported by the column and being operatively interconnected for the selective manual movement of each operator, a bead breaking shoe supported by one of the operators, and a wedging shoe supported by the other of the operators. The linkage provides guided movement for leading each shoe to working positions at diametrically opposite sides of the peripheral line of joinder between wheel and tire and for causing the bead breaking shoe to move into engagement with the wheel and tire for the displacement of the bead from the associated rim bead seat toward the interior annulus of the rim as the opposite side of the rim is held in wedged tight position in situ.

2 Claims, 3 Drawing Figures

TIRE BEAD BREAKER

My invention relates to new and useful improvements in a tire bead breaking apparatus having general utility in the arts, and more particularly aims to provide a manually-operated mechanism suitable for breaking the beads on tires from wheels as used on passenger cars, trucks, motorcycles and/or all-terrain vehicles.

Wheels of the type comprehended herein generally have opposed outer rim flanges adjacent respective tire bead seats which lead to an interior annular area, usually of the drop center type. Many rims are also provided with a raised annular safety bead or hump between at least one of the bead seats and the drop center, the safety bead or hump being the small circular lip which rises behind the tire's inner edge. It offers a significant safety advantage in that a tire provided therewith is not as quickly removable from a rim when it loses its air pressure. Removing a tire from a safety bead wheel is exceedingly difficult, a task made more simple by the invention hereof.

One primary object hereof is to provide an improved device for moving the beads of a pneumatic tire out of "frozen" engagement with complementary portions of the rim of a wheel supporting the tire, or in other words, a mechanism for breaking the beads.

Yet another object is to provide a tire demounting apparatus which is simple in its construction, economical in its manufacture, and efficient in its operation.

In the demounting of a tire from a wheel, the tire beads must first be broken loose from the respective bead seats adjacent the respective wheel rim flanges.

As known, for many years, this has been laboriously accomplished with the use of hand tools, such as chisel-like tools, hammers, jackscrews or the like.

The bead breaking mechanism hereof is manually operated and envisions a stand having a wheel and tire supporting base and an upright or post extending upwardly therefrom, together with a pair of operators, each mounting a shoe, which operators are articulately linked to and project outwardly from the upright and are manually operated first in seriatim and then in unison.

The pair of operators and supporting linkage therebetween are supported by the upright and are operatively interconnected for the selective manual movement of each operator separately or jointly. A bead breaking shoe is supported by one of the operators and a wedging shoe is supported by the other of the operators. The linkage provides guided movement for leading each shoe into working positions at diametrically opposite sides of the peripheral line of joinder between wheel and tire and for causing the bead breaking shoe to move into engagement with the wheel and tire and the wedging shoe to move into engagement with the wheel and tire for the displacement of the bead from the associated rim bead seat toward the interior annulus of the rim as the opposite side of the rim is held in wedged tight position in situ.

One operator called a second operator is manually adjusted as necessity dictates to permit the floating of a second shoe into the desired working position between tire and rim at one side thereof. The term floating is used in the sense that the operator is movable inwardly and outwardly and downwardly and upwardly until the desideratum is attained. Being properly positioned, the other so-called first operator is then manually adjusted so as to bring the first shoe into a wedging relationship between tire and rim whereby the rim is held firmly in position. A continuing force is applied on the second operator so as to force the tire bead to break away from the rim in that area, the pressure on the first operator assuring that the second shoe will not slip rearwardly away from the bead breaking position.

One of the key features of the invention lies in the capability given the operator to control the clamping pressure which is initially exerted by the second shoe upon the tire and to control the wedging pressure as the first shoe is brought into wedging relationship between tire and rim at the diametrically opposite side, the wedging force being increased by the manual manipulation of the first operator as the breaking force is applied to the second operator.

IN THE DRAWINGS

Figure 1:
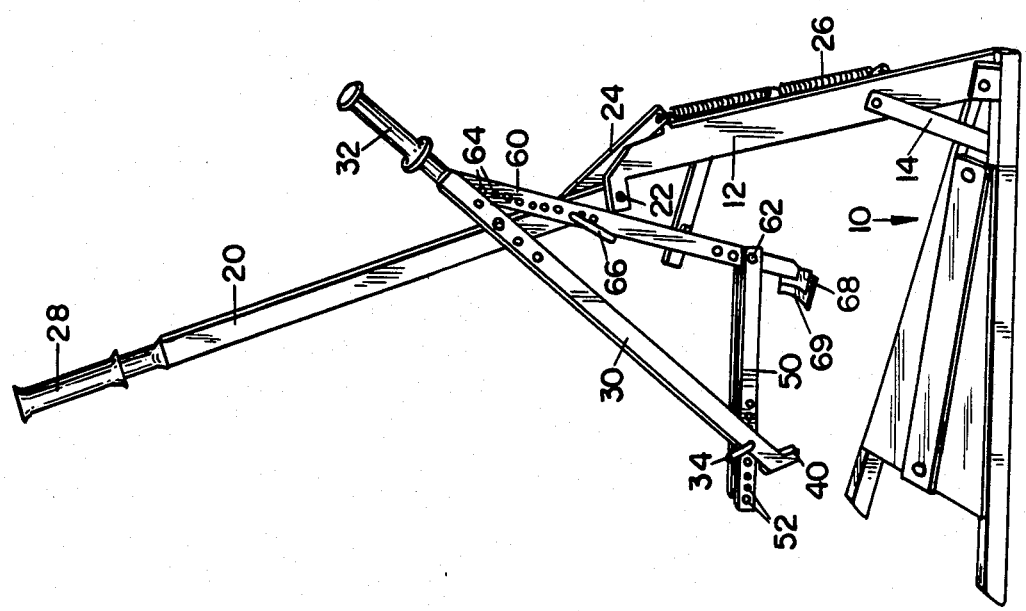
Figure 3:
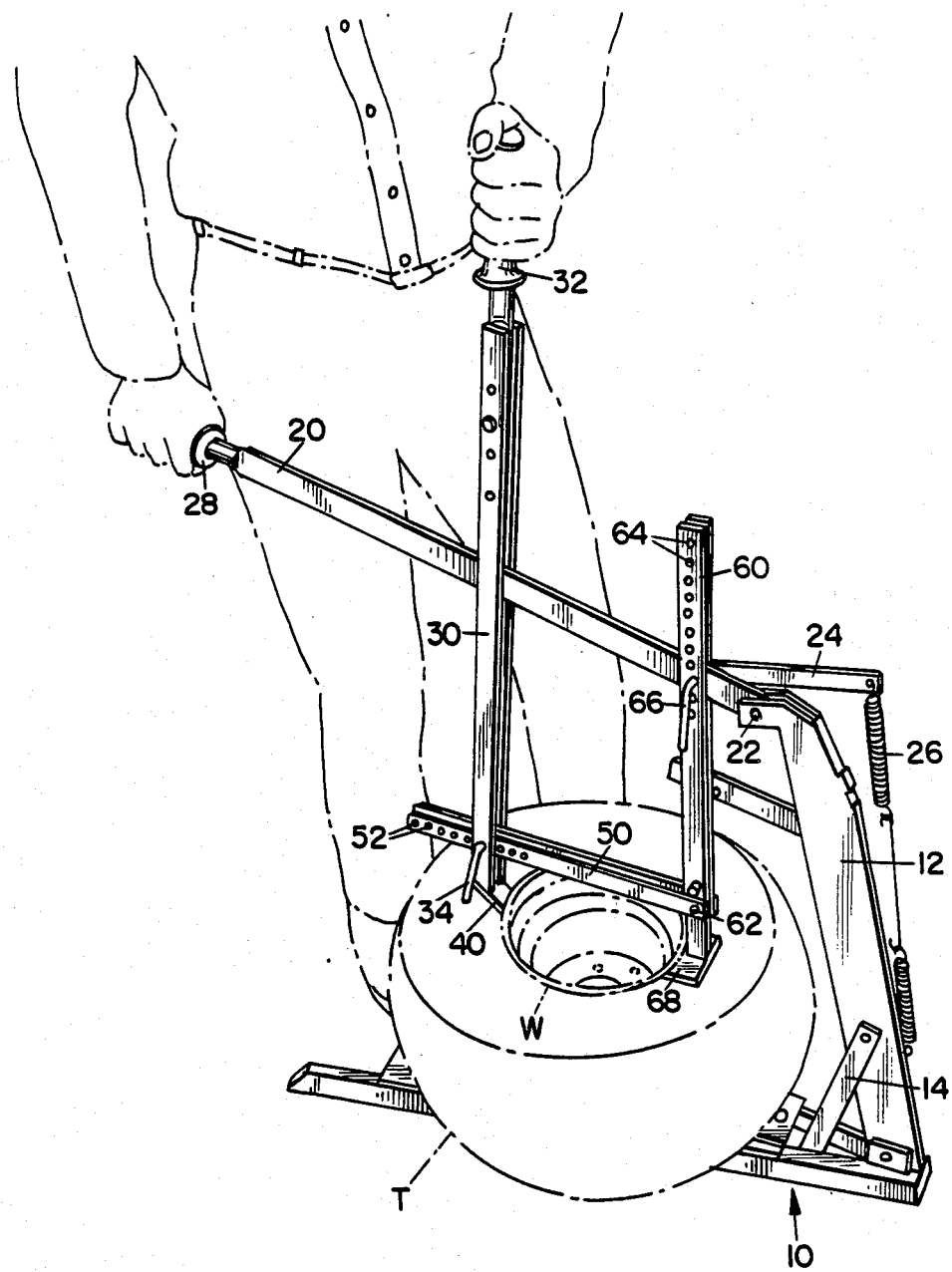

FIG. 1 is a perspective view of the bead breaking mechanism embodying the essential features of the invention; FIG. 2 is a similar view showing a wheel and tire in position thereon; and FIG. 3 is another similar view showing an operator in the process of operating the mechanism.

The mechanism comprehends a horizontally-disposed base or table 10 adapted to support a wheel W having a pneumatic tire T mounted thereon in a manner whereby the wheel may be extended outboard of the base on opposite sides thereof so that it may be more easily manually engaged when it is desired to rotate the wheel relative to the base or to invert it and reposition it thereupon.

If desired, the base could be bolted to a concrete floor, such as in a service station or shop, to provide stability for the mechanism when in use.

An upright or post 12 is fixed to and extends vertically upward from the base terminating in a point above wheel W when same is placed in operational position and may be suitably braced relative to the base as by such as brace arms 14 on opposite sides of the upright.

The upper terminus of upright 12 preferentially is bifurcated to allow the interconnection thereof with the inboard end of a first operator or arm 20 by means of a pivot bolt 22 to the end that the operator may be swung through a vertical axis between upper non-operating and lower operating positions, away from and adjacent the tire and wheel, as shown in FIGS. 1 and 2 respectively.

First operator 20 is constrained in its upper (FIG. 1) position by means of a spring arm 24 rigidly fixed thereto at one of its ends and supporting at its opposite free end on terminus of a spring 26, the opposite spring terminus being fixed to an intermediate position along the upright length, all to allow the spring loading of first operator 20, the spring continually biasing the first operator to move vertically upwardly and away from the base in a clockwise direction toward its normal rest or non-operating position.

The opposite free terminus of first operator 20 is provided with a first hand grip 28.

A second operator or arm 30 preferentially is of spaced two-part construction to allow the passage therethrough of first operator 20 and is provided at its upper free terminus with a second hand grip 32.

Adjacent the opposite lower terminus of second operator 30, a through opening is provided through which an adjusting pin 34 may be extended.

The lower terminus of second operator 30 is provided with a first wedging shoe 40 fixed thereto and angularly disposed relative thereto.

A first auxiliary link 50 is extended through the space in the second operator and is provided with a plurality of openings 52 therethrough to permit the selective positioning of first auxiliary link 50 to second operator 30, these components being held relative to each other by adjusting pin 34 extendable through the aligned openings.

The opposite free terminus of first auxiliary link 50 is pivotally linked to a second auxiliary link 60 by means of a pivot bolt 62.

Adjusting pin 34 serves to accomodate to relative adjusting of first adjusting link 50 and second operator 30 and to compensate for variations in rim diameters ranging normally from as small as 8 inches to as large as 14 inches or more.

The upper terminus of second auxiliary link 60 is pivotally interconnected to first operator 20, there being a plurality of openings 64 through the second auxiliary link for the selective positioning of the first operator and second auxiliary link to each other by means of an adjusting pin 66.

The lower extremity of second auxiliary link 60 is provided with a second bead breaking shoe 68 fixed to the link in an angular relationship.

Shoe 68 is blade-like in configuration and has an arcuate inboard edge 69 adapted to follow the contour of the rim's surface as the blade is drawn toward the median plane of the rim.

The blade is adapted to bear against the tire's side wall and to push against that side wall in a direction inwardly and downwardly toward the center plane of the rim for dislodging the tire's upper bead from the rim's upper bead seat and orienting it in the rim's well.

Any tendency of shoe 68 to roll back or to creep along the tire's side wall away from the bead is precluded by the wedging pressure manually applied through operator 30. The opposing shoes are at diametrically opposite sides of the tire and wheel and may be seen to be sustaining forces in opposite senses as generated by the conjoint action of the two operators.

It will be appreciated that a quadrilateral arrangement has been formed, same being pivotally suspended from a fulcrum 22, with three of the interconnecting points of the quadrilateral being pivotally arranged as to each other and with the remaining interconnecting point being such that each operator may be freely swung relative to the other operator.

The preferred method of operation is first to float the second breaking shoe into the correct working position via the manipulation of the second operator and then to bring the first wedging shoe into a wedging relationship between rim and tire at the opposite side for purposes of holding the rim and tire firmly while the second shoe is then motivated in its bead breaking function. As stated above, the opposing shoes sustain the opposing forces directed toward each other.

To repeat, second operator 30 is first maneuvered so as to bring second breaking shoe 68 into a position where continued pressure will cause the shoe to be inserted between tire and rim. The second operator 30 is then maneuvered so as to bring first wedging shoe into a wedging position against the rim. The first shoe is then moved toward the second shoe by the movement unisonally of operators 20 and 30.

I claim:

1. An apparatus for breaking the bond between the bead of a pneumatic tire and the complementary portion of a rim of a wheel on which the tire is mounted, the apparatus comprising:

a stand having a wheel-and-tire receiving base and a linkage supporting column extending upwardly therefrom, a first operator pivotally connected to the upper extremity of the column for swinging movement in a vertical plane about the pivot and above and relative to a tire and wheel assembly operatively positioned on the base, a bifurcated second operator with the first operator being extendable through the bifurcations, first and second pivotally-interconnected auxiliary links with the second auxiliary link being pivotally connected to the first operator and the first auxiliary link being pivotally connected to the second operator, the second operator being swingable in the vertical plane under guidance of the first operator and in an arc about its pivot with the first link, the operators and links defining an articulated quadrilateral arrangement of swingable elements shiftable as to each other and shiftable relative to the base and column by the pivotal connection between the first operator and column, a bead-breaking shoe fixed to the lower extremity of the second link, a wedging shoe fixed to the lower extremity of the second operator, the operators being manually shiftable independently of each other and conjointly with each other for selective translatory movement of the wedging shoe at one side of the tire and wheel into a pressure-applying clamping position between the tire and wheel responsively to the maneuver of the second operator to stabilize the tire and wheel under the constraint of the first operator as the bead breaking shoe is selectively translatorily moved in a sequential bead breaking path of travel at the side of the wheel and tire diametrically opposite the said one side of the wheel and tire responsively to the maneuver of the first operator with forces being increasingly sustained in opposite senses by the operators for driving the shoes radially toward each other.

2. In the mechanism of claim 1, including spring means connected to the first operator and column and adapted to bias continuously the first operator to a nonworking position relative to the column.

* * * * *